United States Patent
Hawley et al.

(10) Patent No.: US 11,802,517 B1
(45) Date of Patent: Oct. 31, 2023

(54) DRIVER ADJUSTED PEDAL GAIN CONTROL FOR TRAILER TOWING

(71) Applicant: Toyota Motor Engineering & Manufacturing North America, Inc., Plano, TX (US)

(72) Inventors: Thomas S. Hawley, Ann Arbor, MI (US); Luis C. Quinteros, Ann Arbor, MI (US)

(73) Assignees: Toyota Motor Engineering & Manufacturing North America, Inc., Plano, TX (US); Toyota Jidosha Kabushiki Kaisha

( * ) Notice: Subject to any disclaimer, the term of this patent is extended or adjusted under 35 U.S.C. 154(b) by 0 days.

(21) Appl. No.: 18/071,478

(22) Filed: Nov. 29, 2022

(51) Int. Cl.
  *F02D 11/10* (2006.01)
  *B60W 30/182* (2020.01)
  *B60W 30/188* (2012.01)
  *B60W 10/06* (2006.01)

(52) U.S. Cl.
  CPC ......... *F02D 11/105* (2013.01); *B60W 30/182* (2013.01); *B60W 30/188* (2013.01); *B60W 10/06* (2013.01); *B60W 2530/10* (2013.01); *B60W 2530/205* (2020.02); *B60W 2530/207* (2020.02); *B60W 2540/10* (2013.01); *B60W 2552/15* (2020.02); *B60W 2710/0605* (2013.01); *B60Y 2300/28* (2013.01); *F02D 2200/602* (2013.01); *F02D 2200/604* (2013.01); *F02D 2200/606* (2013.01); *F02D 2250/18* (2013.01)

(58) Field of Classification Search
  None
  See application file for complete search history.

(56) References Cited

U.S. PATENT DOCUMENTS

| | | | |
|---|---|---|---|
| 6,519,520 B2 | 2/2003 | Shin | |
| 7,743,859 B2 | 6/2010 | Forsyth | |
| 7,966,115 B2 | 6/2011 | Bellinger | |
| 8,935,080 B2 * | 1/2015 | Szwabowski | B60K 26/04 123/196 S |
| 9,062,614 B2 * | 6/2015 | Szwabowski | F02D 28/00 |
| 9,335,162 B2 | 5/2016 | Kyrtsos et al. | |
| 9,505,400 B2 | 11/2016 | Wright et al. | |

(Continued)

FOREIGN PATENT DOCUMENTS

| | | | | |
|---|---|---|---|---|
| CN | 101423026 A * | 5/2009 | | B60W 30/188 |
| CN | 103225557 A * | 7/2013 | | B60K 26/04 |

(Continued)

OTHER PUBLICATIONS

CarBuzz. "2021 Chevy Corvette Drive Modes" YouTube, Jul. 1, 2021, https://youtu.be/jVRzXJP4Shs.*

(Continued)

*Primary Examiner* — Kevin R Steckbauer
(74) *Attorney, Agent, or Firm* — SNELL & WILMER LLP (57) ABSTRACT

Methods, systems, devices and apparatuses for a pedal gain adjustment system. The pedal gain adjustment system includes a user input device configured to receive user input data indicating a desired pedal setting of the vehicle, and an electronic control unit (ECU) coupled to the user input device. The ECU is configured to determine the vehicle is operating in a tow mode, receive the user input data via the user input device, and adjust the pedal gain based on the user input data.

20 Claims, 6 Drawing Sheets

(56) References Cited

U.S. PATENT DOCUMENTS

| | | | |
|---|---|---|---|
| 9,870,653 B1 | 1/2018 | Fritz et al. | |
| 10,100,750 B2 * | 10/2018 | Bellino | F02D 11/02 |
| 10,189,472 B2 * | 1/2019 | Kava | F02D 41/2422 |
| 10,207,687 B1 | 2/2019 | Shimizu et al. | |
| 10,300,855 B2 | 5/2019 | Lu et al. | |
| 10,933,824 B2 | 3/2021 | Niedert et al. | |
| 11,067,993 B2 | 7/2021 | Gali et al. | |
| 11,135,881 B2 | 10/2021 | Hall et al. | |
| 11,142,208 B2 * | 10/2021 | Janampally | B60W 10/026 |
| 11,708,074 B2 * | 7/2023 | Lacaze | G08G 1/096791 |
| | | | 701/93 |
| 2007/0271017 A1 | 11/2007 | Samie | |
| 2008/0177454 A1 | 7/2008 | Bond et al. | |
| 2013/0197775 A1 * | 8/2013 | Szwabowski | F02D 28/00 |
| | | | 701/101 |
| 2015/0127241 A1 * | 5/2015 | Szwabowski | F02D 13/0203 |
| | | | 701/101 |
| 2017/0297563 A1 * | 10/2017 | Kava | B60W 50/0098 |
| 2018/0258866 A1 * | 9/2018 | Bellino | F02D 11/02 |
| 2021/0009138 A1 * | 1/2021 | Janampally | B60W 40/06 |
| 2021/0253097 A1 * | 8/2021 | Lacaze | B60W 40/105 |
| 2021/0370892 A1 | 12/2021 | Stearns et al. | |

FOREIGN PATENT DOCUMENTS

| | | | | |
|---|---|---|---|---|
| CN | 103225557 B | * | 12/2015 | B60K 26/04 |
| CN | 107298081 A | * | 10/2017 | B60T 8/1887 |
| CN | 108569291 A | * | 9/2018 | B60W 10/04 |
| CN | 108569291 B | * | 7/2021 | B60W 10/04 |
| DE | 102017107921 A1 | * | 10/2017 | B60T 8/1887 |
| DE | 102018104436 A1 | * | 9/2018 | B60W 10/04 |
| RU | 2580366 C2 | * | 4/2016 | B60K 26/04 |

OTHER PUBLICATIONS

Chevrolet. "2021 Chevrolet Corvette Owners Manual." 2020. p. 207-213.*

* cited by examiner

DRIVER ADJUSTED PEDAL GAIN CONTROL FOR TRAILER TOWING

BACKGROUND

Field

This disclosure relates to a system, method, apparatus and/or device for adjusting a pedal gain of a vehicle based on a trailer size detection.

Description of the Related Art

Operators or drivers of vehicles may carry cargo in or on various locations of the vehicles (e.g., trunks, truck beds, or on roof racks). Additionally, drivers may tow open or closed trailers, other vehicles, and mobile homes with their vehicles. Conventional systems and methods provide a towing mode that allows adjustment or modification of the pedal mapping and the shift schedule to use lower gears. This adjustment or modification is a single fixed calibration that cannot be modified by the driver or user. However, the driver is not able to change anything about the driving characteristic other than selecting tow or normal mode, which are very binary modes unable to be adjusted or modified by the driver.

As such, there is a need for a method and a system for providing the driver more control of the driving experience when towing. For instance, the control will allow the driver to change the pedal gain to improve the towing experience.

SUMMARY

In general, one aspect of the subject matter described in this disclosure may be embodied in a pedal gain adjustment system. The pedal gain adjustment system includes a user input device configured to receive user input data indicating a desired pedal setting of the vehicle, and an electronic control unit (ECU) coupled to the user input device. The ECU is configured to determine the vehicle is operating in a tow mode, receive the user input data via the user input device, and adjust the pedal gain based on the user input data.

In one aspect, a method for adjusting a pedal gain of a vehicle based on user input includes determining the vehicle is operating in a tow mode, receiving user input data via a user input device, and adjusting the pedal gain based on the user input data.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for a pedal gain adjustment system that receives user input and adjusts a pedal gain accordingly. The pedal gain adjustment system allows the driver to better control the driving experience while towing a trailer. The driver is allowed to control or change the pedal gain in real-time to improve the towing experience. Particularly, the driver may select an operating position on a driveforce map to improve pedal to acceleration relationship with higher mass and road load while towing. For instance, typically when a driver presses down 25% on pedal, the vehicle outputs a first acceleration level, but when the vehicles is in-tow, the same 25% pedal press will accomplish a lower acceleration. With pedal gain adjustment, the engine output will increase, and driving force will increase to overcome the additional load while the feel of the pedal remains the same for the driver regardless of the size of the trailer being towed.

During development, a specific pedal to acceleration map for the vehicle is programmed and stored. A wide range of towing conditions may be available considering the variety of trailer sizes and weights. As such, allowing the driver to select where on the map the vehicle operates beneficially creates a highly customizable driving experience for the driver. Further, while the pedal gain adjustment system is compatible with conventional, hybrid powertrain, and electric vehicles (EV), implementing the system within an EV allows more flexibility for user customization to improve their driving experience (i.e., the system allows the driver much more control over the power train behavior than previously available). For example, the maximum and minimum boundaries set by the manufacturer can be adjusted by the user.

Figure 1A:
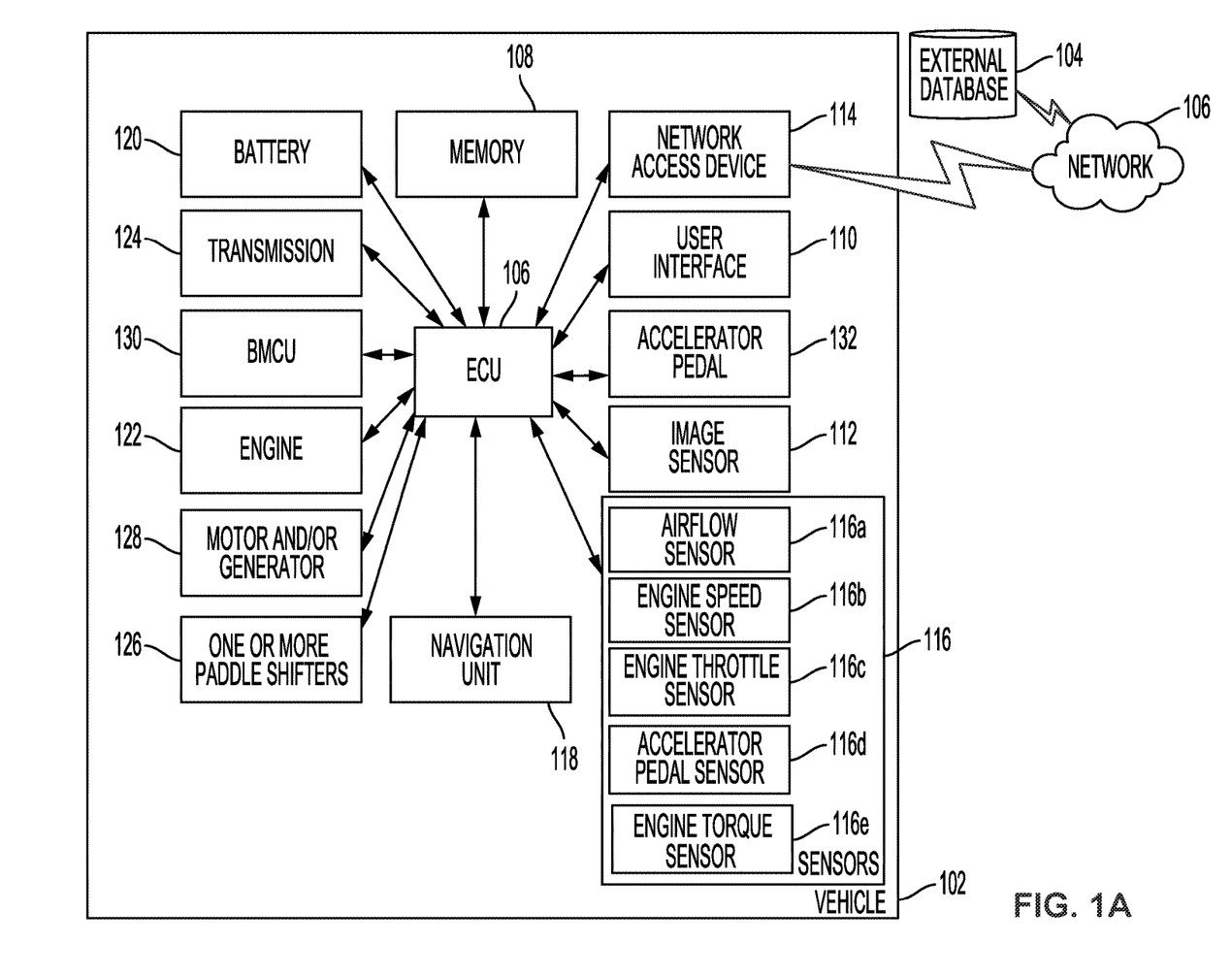
FIG. 1A is a block diagram of a pedal gain adjustment system according to an aspect of the invention.

FIG. 1A is a block diagram of a pedal gain adjustment system 100. The pedal gain adjustment system 100 or a portion thereof may be retro-fitted, coupled to, include or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

Figure 1B:
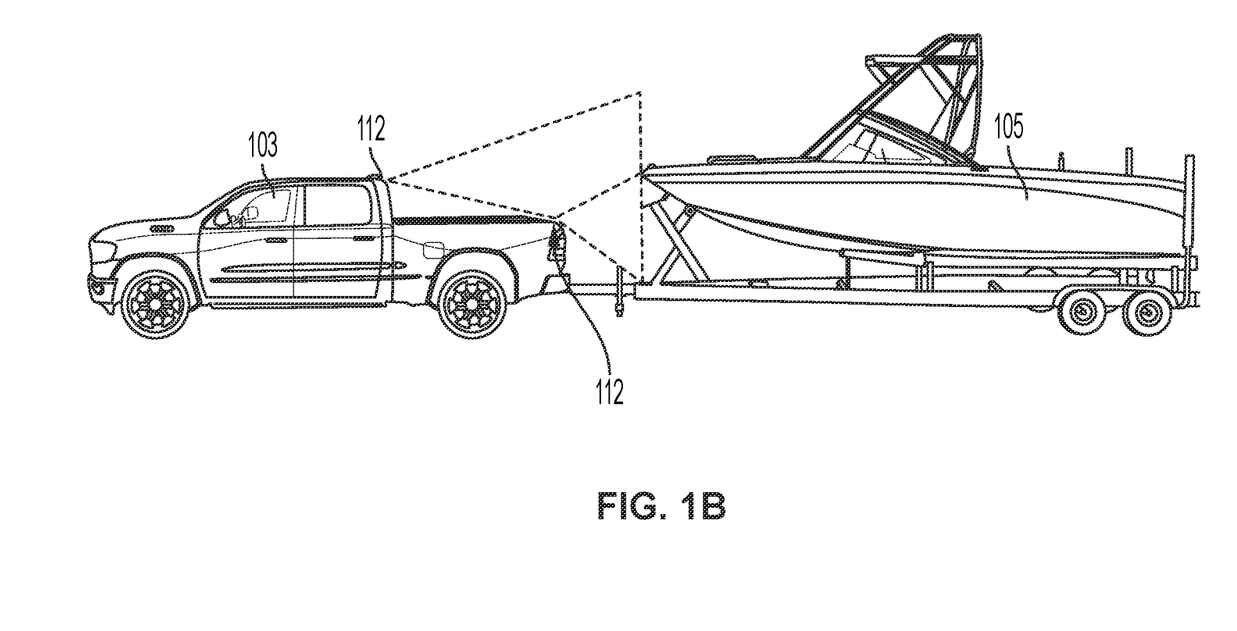
FIG. 1B illustrates the vehicle of FIG. 1A configured as a towing vehicle according to an aspect of the invention.

Referring briefly to FIG. 1B, in various embodiments, the vehicle 102 may be configured to tow (e.g., be configured as a towing vehicle 103) another vehicle, trailer, etc. (e.g., a towed vehicle 105). A towing rod or bar 107 may be used to secure and attach the towing vehicle 103 to the towed vehicle 105. The towing vehicle 103 may have a bumper and/or a connector that is used to connect the towing vehicle 103 to the towing rod or bar 107, which is connected to a bumper and/or a connector of the towed vehicle 105. In various embodiments, the towed vehicle 105 may be a boat, a flat bed trailer (with or without another vehicle stowed thereon), a box trailer, etc. In various aspects, the towing vehicle 103 may be a motorhome or a recreational vehicle (RV), for example, configured to tow a towed vehicle (e.g., a sports utility vehicle (SUV)) where the towed vehicle is being flat towed (i.e., all wheels are on the ground).

Referring again to FIG. 1A, the pedal gain adjustment system 100 may include or be coupled to a database 104. A database is any collection of pieces of information that is organized for search and retrieval, such as by a computer, and the database may be organized in tables, schemas, queries, reports, or any other data structures. A database may use any number of database management systems. The database 104 may include a third-party server or website that stores or provides information. The information may include real-time information, periodically updated information, or user-inputted information. A server may be a computer in a network that is used to provide services, such as accessing files or sharing peripherals, to other computers in the network. The database 104 may be located inside the vehicle 102.

Figure 3A:
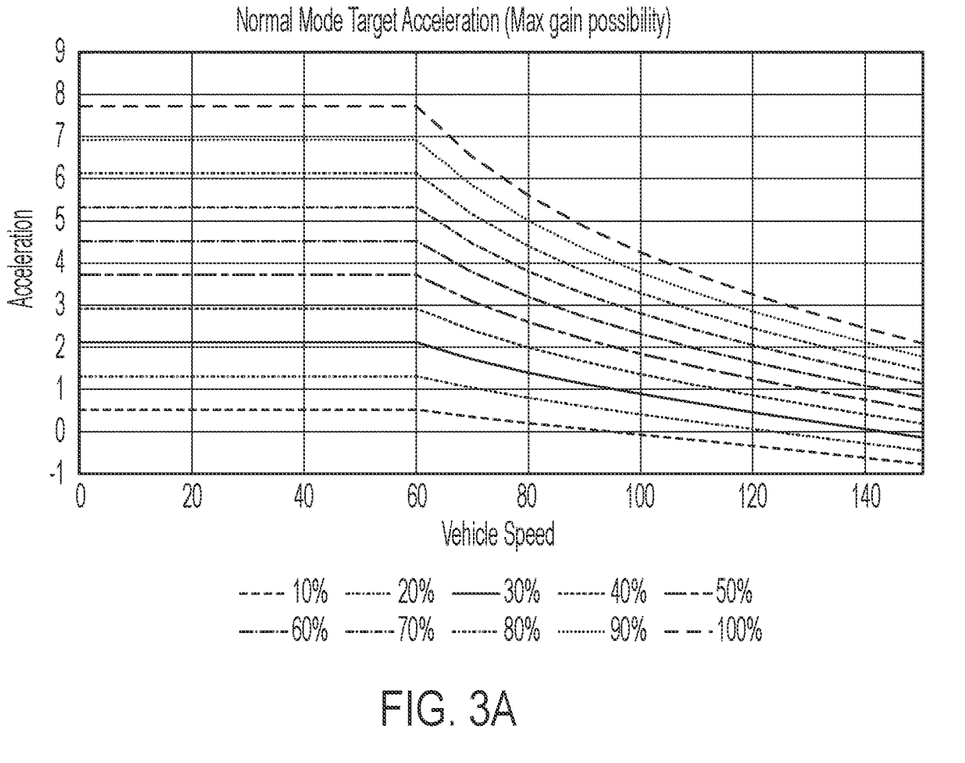
FIGS. 3A-3B are example acceleration maps for use with the pedal gain adjustment system of FIG. 1 according to an aspect of the invention.
Figure 3B:
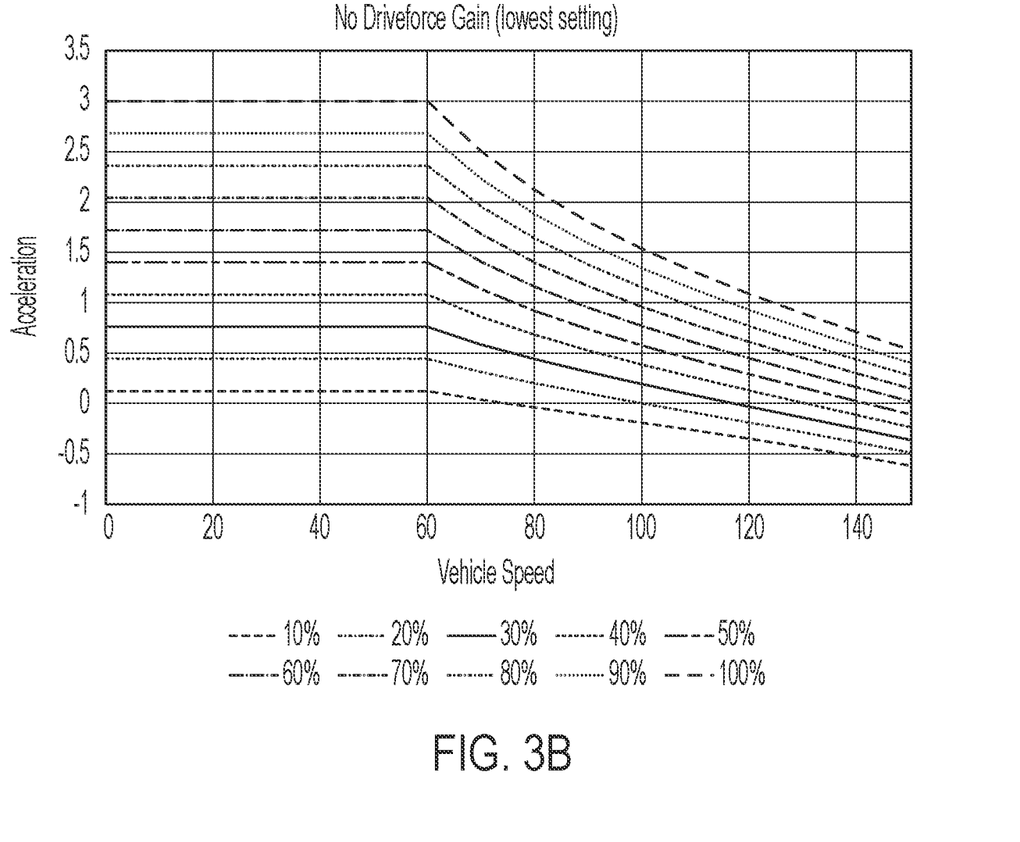

The database 104 may include an acceleration map (e.g., drive force map) (e.g., see FIGS. 3A-3B). The acceleration map may include preset values of a comparison between an acceleration and a vehicle speed per amount (%) the accelerator pedal is depressed. For every pedal depression and vehicle speed there is a target drive force, which is calculated to an acceleration, where Acceleration=(Drive Force− Towing Road Load)/Towing Mass. That driveforce is then applied to the new towing. The setting is then interpolated between the calculated acceleration maps to meet the desired drive force. The acceleration map may be downloaded by the pedal gain adjustment system 100. The system 100, in response to driver input for pedal aggressiveness, modifies the drive force map to create the desired result for the driver. For instance, a maximum pedal to acceleration that can be achieved is shown in FIG. 3A. A user may set the system 100 to a level 3 of acceleration, for example, such that a 40% pedal depression with achieve the same drive force regardless of the towing mode and/or regardless of what the towing vehicle 103 is towing. Further, the database 104 may include a lowest setting acceleration map (e.g., see FIG. 3B). Minimum values may be set by an OEM. Depending on the "aggressiveness," or acceleration level, chosen by the driver, the acceleration map will be calculated as an interpolation between the two maps (FIG. 3A and FIG. 3B) to give the desired preference to the driver.

Figure 2:
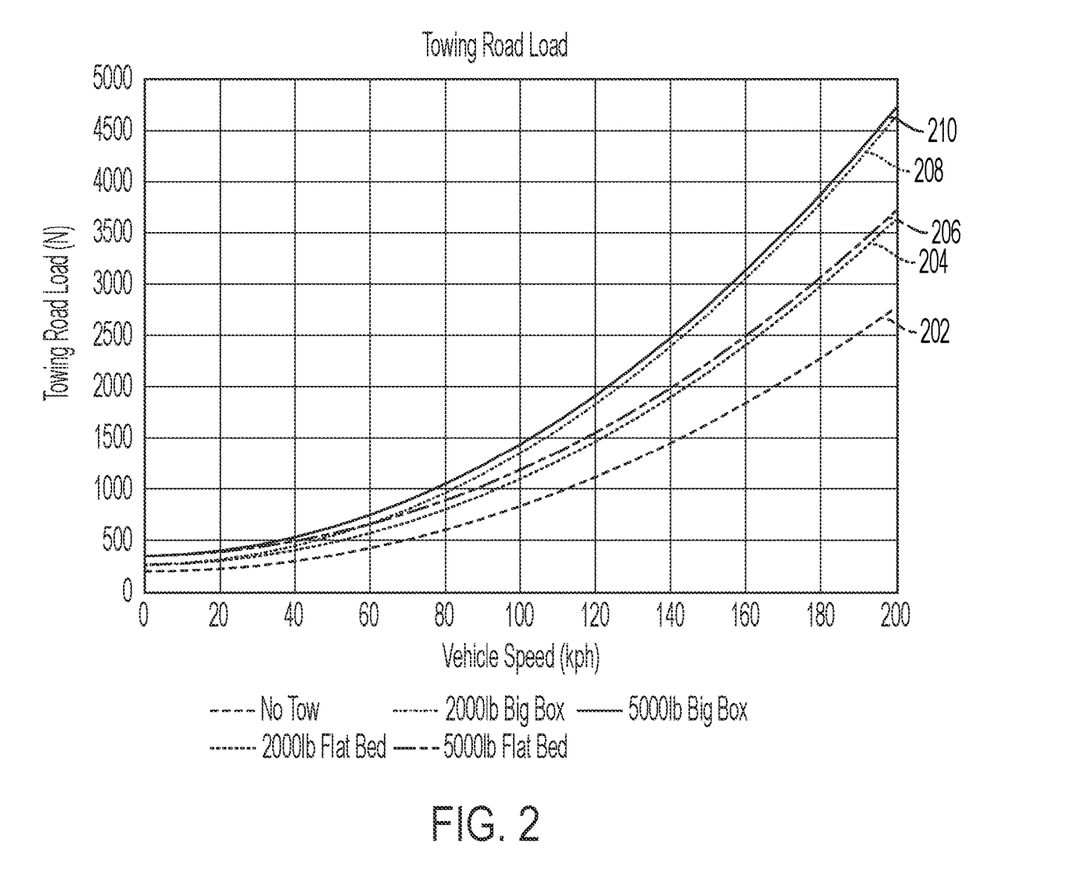
FIG. 2 is an example graph of determining a towing road load use with the pedal gain adjustment system of FIG. 1 according to an aspect of the invention.

The pedal gain adjustment system 100 includes one or more processors, such as the electronic control unit (ECU) 106. The one or more processors, such as the ECU 106, may be implemented as a single processor or as multiple processors. For example, the one or more processors may be a microprocessor, data processor, microcontroller or other controller, and may be electrically coupled to some or all the other components within the vehicle 102. The one or more processors may obtain user input data to determine how to adjust the pedal gain, as described herein. The ECU 106 is configured to calculate a towing road load (e.g., resistance to acceleration). For instance, as illustrated in FIG. 2, the towing road load N may be correlated with the vehicle speed and the mass of the towed vehicle 105. Further, aerodynamic draft F is a factor of towing road load ($F=\frac{1}{2}*Cd*A*\rho*V^2$), where Cd is an aerodynamic coefficient (e.g., a standard value for the type of trailer), A is the fontal area of the trailer (e.g., as detected by an image sensor of the pedal gain adjustment system 100), p is an air density, and V is a velocity of the vehicle 102. During a towing condition, the driving force required to maintain speed is increased vs. the non-towing condition due to the mass and the road load force. The largest contributing factor is the road load force at higher speed. As such, the ECU 106 may be configured to detect the "trailer type" to select the trailer category (e.g., a boat/car hauling, flat bed/utility, box trailer, etc.). The image processing of the pedal gain adjustment system 100 detects the height and shape of the load to calculate the frontal area A and make the determination on the type of load being towed. Based on the type of trailer detected, the aerodynamic coefficient Cd for that trailer type may be set. With the aerodynamic coefficient Cd set and the frontal area A calculated, the aerodynamic drag for that trailer is calculated. Accordingly, the pedal to drive force mapping may be changed at the higher speed to keep a similar acceleration to pedal relationship as speed increases with higher road load. The ECU 106 may use the database 104 to adjust appropriately.

The memory 108 may be coupled to the ECU 106. The memory 108 may include one or more of a Random Access Memory (RAM), a Read Only Memory (ROM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. To give the driver further control, the memory 108 may store a mapping between the pedal gain/adjustment desired and selected user input. The pedal gain adjustment system 100 may be configured to display an option to the driver (via a user interface) to activate or deactivate smart trailer pedal learning.

The pedal gain adjustment system 100 may include a user interface 110. The user interface 110 may be part of the vehicle 102 or a vehicle head unit (not shown). The user interface 110 may include an input device that receives user input from a user interface element, a button, a knob, a dial, a keyboard, a mouse, a touchscreen, a microphone, or the like. The input device may receive input from a user of the vehicle 102 such as a driver or a passenger. The input device may receive, for example, information corresponding to a request for cruise control, information usable to control an auxiliary component on or within the vehicle 102 (e.g., to control a navigation device or a stereo), or the like. In some embodiments, the input device may include additional input device(s) usable to control the vehicle 102 such as an accelerator pedal, a brake pedal, a steering wheel, or the like. The input device may also receive information corresponding to a request for the vehicle 102 to drive autonomously.

The input device may be configured to receive information regarding the frontal area, the trailer type, trailer mass, and pedal "aggressiveness." For instance, the driver can measure the frontal area, the input device may coach the driver through the process, and/or the pedal gain system may automatically detect the frontal area (e.g., via the image sensor, described herein). If the trailer is connected, the driver can use the rear cameras to highlight to trailer in the image and it will calculate the frontal area. The trailer type may be a selectable list. The driver may be prompted to select whether the towing vehicle 105 is a box trailer, a flat bed trailer, a utility trailer, a boat trailer, a car hauler, etc. The driver may input the estimated mass or the towing vehicle 105, and/or the system 100 may input the estimated mass based on the trailer type selected. Further, the driver may manually select a desired pedal "aggressiveness," where the aggressiveness correlates with the pedal gain in that the driver may prefer a light pedal depression to achieve a large acceleration. The user interface may depict the selection as a sliding scale between a maximum and a minimum drive force available.

The user interface 110 may include, provide or be coupled to an output device. The output device may include any output device such as a speaker, a display, a touchscreen, or the like. The output device may output data to a user of the vehicle 102. The output device may, for example, output information corresponding to a status of the pedal gain adjustment, a status of an environment surrounding the vehicle 102 (e.g., information related to size of the trailer and/or a graphical representation thereof), and/or the like. Moreover, the output device 150 may output information corresponding to a menu for selecting the desired tow mode, for example.

In some embodiments, the user interface 110 may be a user interface device attached to or integrated with the vehicle 102 (e.g., an infotainment system configured to receive or output data). In some embodiments, the user interface 110 may be a user interface available on a remote device (not shown) such as, e.g., a smartphone, a tablet, or the like (e.g., which may be used to run a software program application to control various components on or within the vehicle 102) which may be connected to the vehicle 102 via wire or wirelessly. For example, the vehicle 102 may further include a transceiver or network access device (not shown) which may be utilized to establish a wireless connection between the vehicle 102 and the remote device including the user interface 110. The wireless connection may be provided by any type of wireless connection known in the art such as, for example, Bluetooth, Wi-Fi, a cellular protocol, Zigbee, or any other communications (e.g., wireless) protocol. The network access device may be referred to as a data communication module (DCM) and may communicate with any device or component included in the system 100 and/or any remote device.

The pedal gain adjustment system 100 may include at least one image sensor 112. The image sensor 112 may be connected to the vehicle 102 and may detect image data (including, e.g., a plurality of images and/or videos) corresponding to an environment surrounding the vehicle 102, data corresponding to a trailer being towed, and/or the like. For example, the image sensor 112 may include a camera or any other image sensor capable of detecting image data (e.g., based on light having any wavelength). The image sensor 112 may include one or multiple image sensors which may be oriented to detect image data in any direction relative to the vehicle 102. For example, the image sensor 112 may detect image data relating to a size of the trailer being towed (e.g., edge detection of the trailer) (see, e.g., FIG. 1B). In some embodiments, the image sensor 112 may be attached on or within the vehicle 102, such as, e.g., on a tailgate and/or a top of a cab of the vehicle 102, and/or the like (see, e.g., FIG. 1B). As such, the image sensor 112 positioned on the tailgate and the image sensor 112 positioned on the top of the cab cooperate together to capture the entirety of an image of the towed vehicle 105. The at least one image sensor 112 may be positioned along the vehicle 102 wherever suitable to detect the towed vehicle 105. For instance, to get an accurate frontal area judgement, the towed vehicle 105 and the towing vehicle 103 will need to be straight inline to use a combination of the bed and tailgate camera to estimate frontal area. With a straight vehicle to vehicle combination for some duration, the image detection can understand which area of the image is trailer and which is background. Further, steering wheel angle must be straight within certain degree tolerance for a calibratable distance to ensure the towed vehicle 105 and the towing vehicle 103 are straight in line for measurement. Both the steering wheel angle tolerance and distance required are calibratable values (e.g., based on vehicle type and/or how important accuracy is for the particular application). The tolerance may be a fixed value by OEM.

The image sensor 112 may include one or more sensors capable of detecting a status of a vehicle component (e.g., the trailer in tow) and/or an environment surrounding the vehicle 102. For example, the image sensor 112 may include a RADAR (Radio Detection and Ranging) detector or sensor, a LIDAR (Light Detection and Ranging) detector or sensor, a LASER Doppler based detector or sensor, and/or the like. In some embodiments, the image sensor 112 may be a single sensor, dual sensors, or a plurality of sensors. In various embodiments, the image sensor 112 may be integrated into the vehicle 102. In various embodiments, the image sensor 112 may be a separate component configured to be coupled to the vehicle 102. Additionally, for more accurate measurements considering if the image sensor 112 (e.g., cameras) becomes covered with mud or anything else that impacts visibility, rear parking sensors can be used to gather the width of the trailer to improve the measurement accuracy. This may need to be used while driving to avoid picking up objects that are not the trailer. Camera visibility may further be retained by stowing the image sensor 112 when not in use and deploying when needed.

The pedal gain adjustment system 100 may include a network access device 114. The network access device 114 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 114 may transmit data to and receive data from the different components besides the sound enhancement system 100, such as the vehicle 102 and/or the database 104.

The pedal gain adjustment system 100 may include one or more sensors 116. The one or more sensors 116 may include an airflow sensor 116a, an engine speed sensor 116b, an engine throttle sensor 116c and/or an accelerator pedal sensor 116d. The airflow sensor 116a may be positioned at an air inlet of the engine 122 and measure an amount of airflow and/or a rate of the airflow into the engine 122. The engine speed sensor 116b may measure a rotation speed of the crankshaft of the engine 122. The engine speed sensor 116b may measure the revolutions per minute (RPM) of the rotation of the engine crankshaft. The engine throttle sensor 116c may measure or determine the throttle position to determine the engine load. The accelerator pedal sensor 116d may be coupled to the accelerator pedal 132. The accelerator pedal sensor 116d may measure, detect or determine a position of the accelerator pedal 132 to determine the amount that the accelerator pedal 132 of the vehicle 102 is depressed. The one or more sensors 116 may include an engine torque sensor 116e. The engine torque sensor 116e may measure or determine the torque or the rotational force on the engine 122. The one or more sensors 116 may include one or more other sensors, such as a shift position sensor to detect the shift position or the gear position (i.e., which gear) of the transmission 124.

The pedal gain adjustment system 100 may be coupled to one or more vehicle components of the vehicle 102. The one or more vehicle components may include a navigation unit 118. The navigation unit 118 may be integral to the vehicle 102 or a separate unit. The vehicle 102 may include a Global Positioning System (GPS) unit (not shown) for detecting location data including a current location of the vehicle 102 and date/time information instead of the navigation unit 118. In some implementations, the ECU 106 may perform the functions of the navigation unit 118 based on data received from the GPS unit. The navigation unit 118 or the ECU 106 may perform navigation functions. Navigation functions may include, for example, route and route set prediction, providing navigation instructions, and receiving user input such as verification of predicted routes and route sets or destinations. The navigation unit 118 may be used to obtain navigational map information. The navigational map information may include a starting location of the vehicle 102, a current location of the vehicle 102, a destination location, a route between the starting location of the vehicle 102 and the destination location and/or date/time information.

The one or more vehicle components may include a motor and/or generator 128. The motor and/or generator 128 may convert electrical energy into mechanical power, such as torque, and may convert mechanical power into electrical energy. The motor and/or generator 128 may be coupled to the battery 120. The motor and/or generator 128 may convert the energy from the battery 120 into mechanical power, and may provide energy back to the battery 120, for example, via regenerative braking. The one or more vehicle components may include one or more additional power generation devices, such as an engine 122 or a fuel cell stack (not shown). The engine 122 combusts fuel to provide power instead of and/or in addition to the power supplied by the motor and/or generator 128.

The battery 120 may be coupled to the motor and/or generator 128 and may supply electrical energy to and receive electrical energy from the motor and/or generator 128. The battery 120 may include one or more rechargeable batteries and may supply the power to the sound enhancement system 100.

The battery management control unit (BMCU) 130 may be coupled to the battery 120 and may control and manage the charging and discharging of the battery 120. The BMCU 130, for example, may measure, using battery sensors, parameters used to determine the state of charge (SOC) of the battery 120. The BMCU 130 may control the battery 120.

The one or more vehicle components may include a transmission 124. The transmission may have one or more gears, a drivetrain, a clutch and/or a drive shaft. The transmission 124 converts the power from the engine 122 to move the wheels of the vehicle 102. The one or more vehicle components may include one or more paddle shifters 126. The one or more paddle shifters may adjust a shift position of the gears within an automatic transmission. The one or more paddle shifters 126 may be manually depressed, pushed, pulled or otherwise positioned to manually change gears of the transmission 124 electrically.

The pedal gain adjustment system 100 may have or use a network 134 to communicate among different components, such as among the vehicle 102 and/or the database 104. The network 134 may be a Dedicated Short-Range Communication (DSRC) network, a local area network (LAN), a wide area network (WAN), a cellular network, the Internet, or combination thereof, that connects, couples and/or otherwise communicates among the different components of the sound enhancement system 100.

Figure 4:
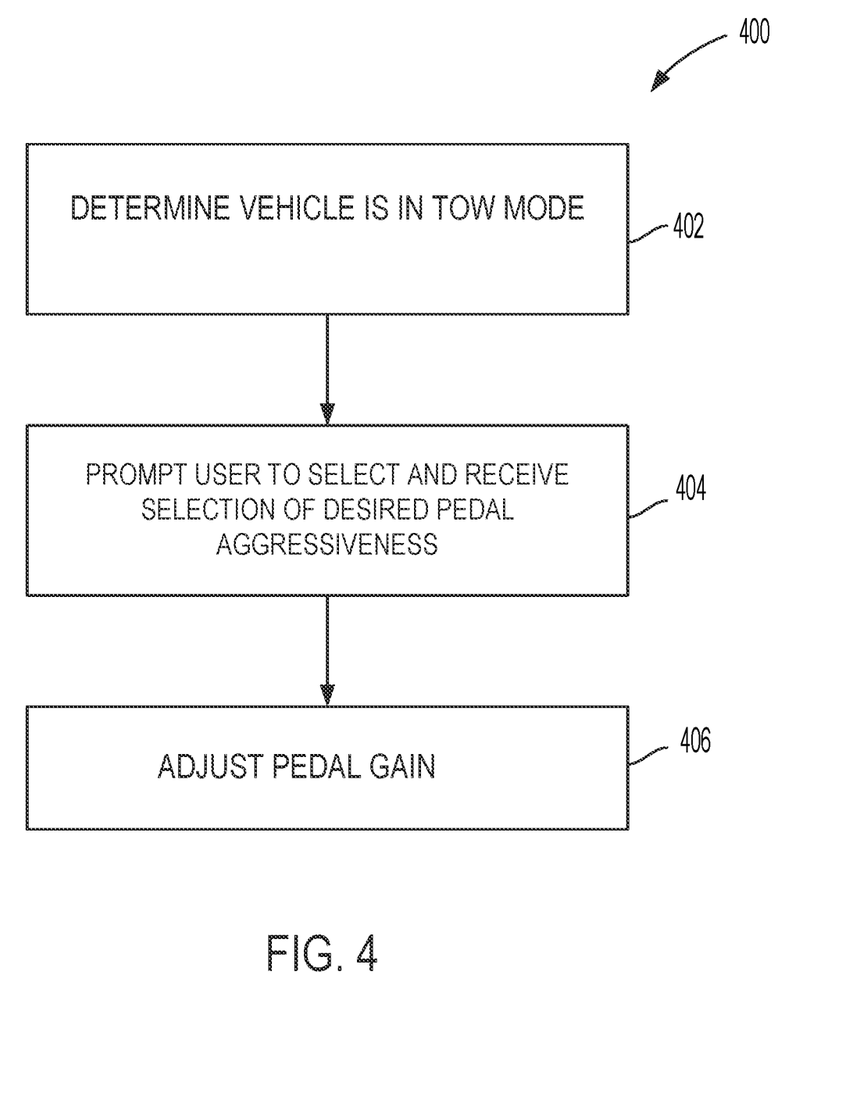
FIG. 4 shows a flow diagram of an example process for adjusting a pedal gain of a vehicle based on user input using the pedal gain adjustment system of FIG. 1 according to an aspect of the invention.

FIG. 4 is a flow diagram of a method 400 for adjusting a pedal gain of a vehicle (e.g., vehicle 102) based on user input. One or more computers or one or more data processing apparatuses, for example, the ECU 106 of the pedal gain adjustment system 100 of FIG. 1, appropriately programmed, may implement the process 400. The pedal gain adjustment system 100 may be used to generate and/or output an adjustment of the pedal gain the vehicle 102 based on a towing road load (e.g., vehicle speed, aerodynamic drag, etc.). The pedal gain adjustment system 100 can be implemented on electric vehicles, which do not have an engine or a transmission. The pedal gain adjustment system 100 may use various sensor data, such as the amount or the rate of airflow, the engine speed, the throttle position, the engine torque, the accelerator pedal position, the trailer brake sensor and/or a combination thereof, to generate the pedal gain adjustment of the vehicle 102.

The pedal gain adjustment system 100 determines whether the vehicle 102 is in tow mode (402). The pedal gain adjustment system 100 may use one or more sensors 116, such as the trailer brake sensor or a trailer wire harness is connected, to determine the vehicle 102 is connected to a towed vehicle. In various embodiments, the tow mode may be determined to be on based on user input. In response to determining tow mode is activated, the pedal gain adjustment system 100, via the ECU 106, prompts a driver to select a desired pedal "aggressiveness," and received such a selection (404).

Accordingly, the pedal gain adjustment system 100 is configured to adjust the pedal gain (406). For instance, with reference to FIGS. 3A-3B, the driver may set the system 100 to a level 3 of acceleration, for example, such that a 40% pedal depression with achieve the same drive force regardless of the towing mode and/or regardless of what the towing vehicle 103 is towing. As such, allowing the driver to select where on the map the vehicle operates beneficially creates a highly customizable driving experience for the driver.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A pedal gain adjustment system for a vehicle, comprising:
    a user input device configured to receive user input data indicating a desired pedal setting of the vehicle, the desired pedal setting corresponding to a drive force; and
    an electronic control unit (ECU) coupled to the user input device and configured to:
        determine the vehicle is operating in a tow mode,
        receive the user input data via the user input device, and
        adjust a pedal gain of the vehicle based on the user input data.

2. The pedal gain adjustment system of claim 1, wherein the vehicle is a towing vehicle configured to tow a towed vehicle, the towing vehicle and the towed vehicle being coupled together.

3. The pedal gain adjustment system of claim 1, wherein the user input device is configured to depict an option to input the user input data as a sliding scale to select the desired pedal setting between a maximum and a minimum drive force.

4. The pedal gain adjustment system of claim 1, further comprising an image sensor configured to detect a trailering load attached to the vehicle, the image sensor coupled to the ECU.

5. The pedal gain adjustment system of claim 4, wherein the ECU is further configured to:
determine a frontal area of the trailering load, and
determine a category of the trailering load based on the frontal area.

6. The pedal gain adjustment system of claim 5, wherein the category of the trailering load is at least one of a boat, a flat bed trailer, or a box trailer.

7. The pedal gain adjustment system of claim 5, wherein the ECU is further configured to determine a towing road load of the vehicle based on the category of the trailering load.

8. The pedal gain adjustment system of claim 7, wherein the towing road load is based at least partially on an aerodynamic draft of the trailering load, wherein the aerodynamic draft is a product of an aerodynamic coefficient, the frontal fontal area of the trailering load, an air density, and a velocity of the vehicle.

9. The pedal gain adjustment system of claim 8, wherein the aerodynamic coefficient is a standard value based on the category of the trailering load.

10. The pedal gain adjustment system of claim 1, further comprising a memory coupled to the ECU, wherein the memory is configured to store a correlation between the pedal gain adjustment and the user input data.

11. A method for adjusting a pedal gain of a vehicle based on user input, the method comprising:
determining the vehicle is operating in a tow mode;
receiving user input data indicating a desired pedal setting of the vehicle via a user input device, the desired pedal setting corresponding to a drive force; and
adjusting the pedal gain of the vehicle based on the user input data.

12. The method of claim 11, wherein the vehicle is a towing vehicle configured to tow a towed vehicle, the towing vehicle and the towed vehicle being coupled together.

13. The method of claim 11, further comprising depicting an option, via the user input device, to input the user input data as a sliding scale to select the desired pedal setting between a maximum and a minimum drive force.

14. The method of claim 11, further comprising detecting a trailering load attached to the vehicle.

15. The method of claim 14, further comprising determining a frontal area of the trailing load and determining a category of the trailering load based on the frontal area.

16. The method of claim 15, further comprising determining a towing road load of the vehicle based on the category of the trailering load.

17. The method of claim 16, wherein the towing road load is based at least partially on an aerodynamic draft of the trailering load, wherein the aerodynamic draft is a product of an aerodynamic coefficient, the frontal area of the trailering load, an air density, and a velocity of the vehicle.

18. The method of claim 17, wherein the aerodynamic coefficient is a standard value based on the category of the trailering load.

19. The method of claim 15, wherein the category of the trailering load is at least one of a boat, a flat bed trailer, or a box trailer.

20. The method of claim 11, further comprising storing, via a memory, a correlation between the pedal gain adjustment and the user input data.

* * * * *